3,335,255
ARC EROSION MILLING MACHINE
Harold E. Ebersole and Thomas E. Denham, Cincinnati, Ohio, assignors to Avco Corporation, Cincinnati, Ohio, a corporation of Delaware
Filed Nov. 14, 1963, Ser. No. 323,766
8 Claims. (Cl. 219—69)

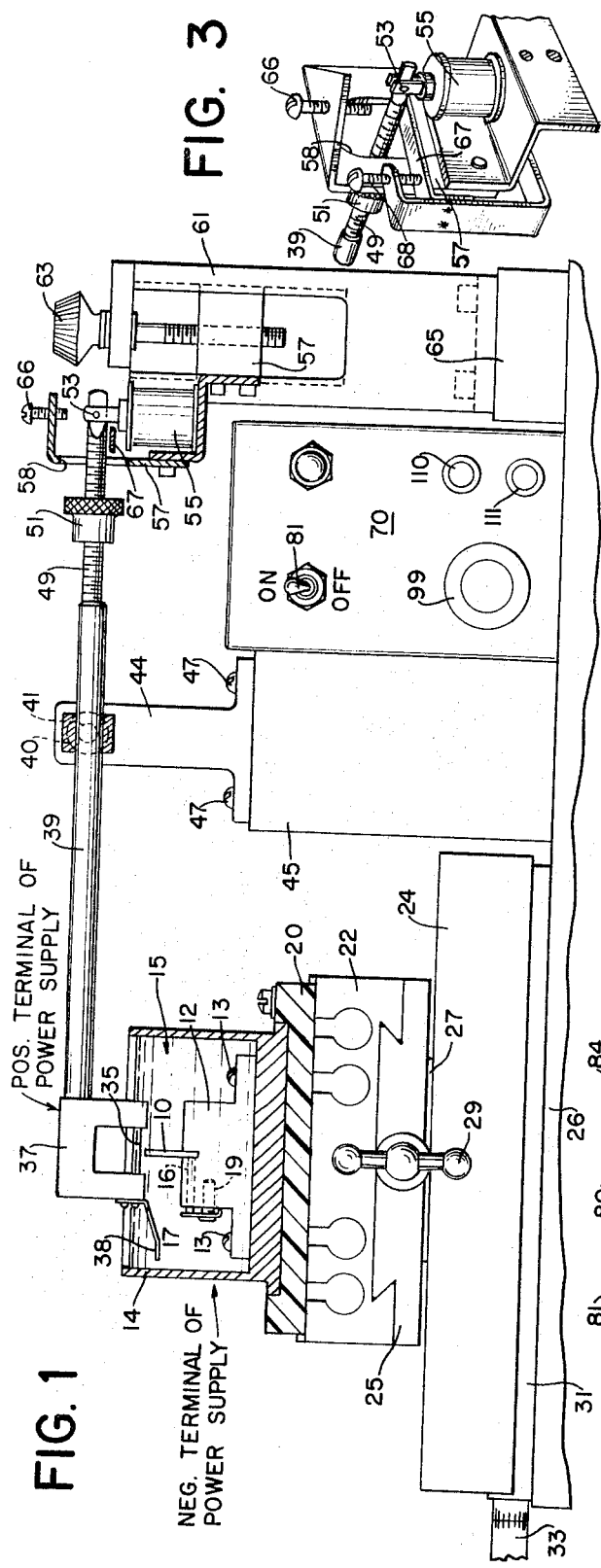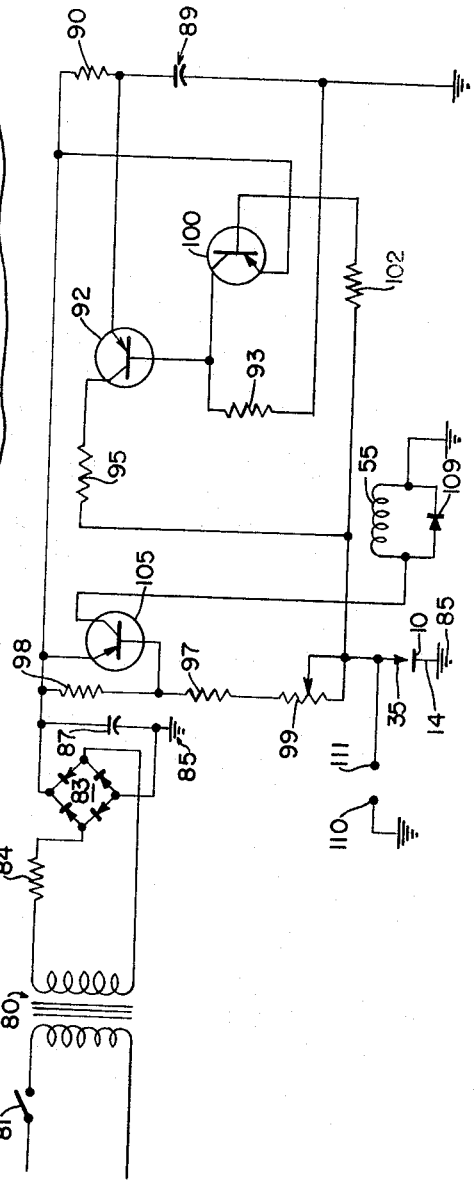
INVENTORS
HAROLD E. EBERSOLE
THOMAS E. DENHAM
BY Darley & Darley
ATTORNEYS

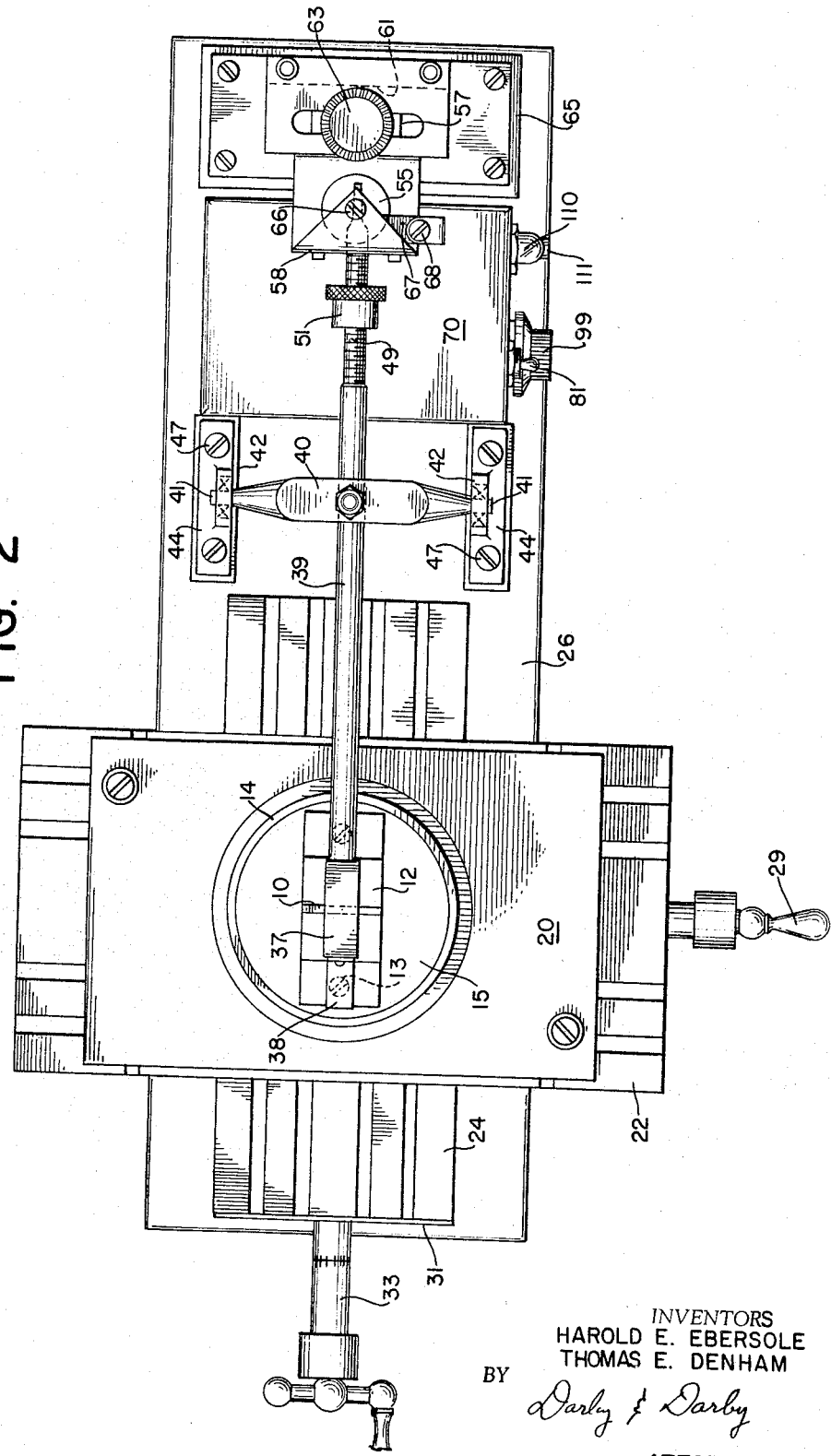

ABSTRACT OF THE DISCLOSURE

This is an arc erosion device. A counterbalanced and damped arm normally urges a tool electrode into contact with a work electrode, closing a discharge path for an energy storage capacitor to provide an arc discharge which is sustained momentarily as the arm is swung by a solenoid to retract the tool from the work. This retraction opens the discharge path of the storage capacitor, which is then charged up, being a part of a time constant network. A first transistor provides the variable resistance in the shunt path. A second transistor senses the flow of current between the electrodes and cuts off the first transistor, terminating the arc discharge. A third transistor responds to the flow of current between the electrodes to actuate the solenoid. The discharge path of the storage capacitor is the shunt path. A vane, attached to a tool-carrying head and immersed in a quenching fluid surrounding the erosion zone, conveniently functions as a part of the damping means.

---

This invention relates to milling machines and more particularly to a milling machine of the arc erosion type.

There are many situations in which it is necessary to cut or machine hard, brittle material to close tolerances. One such situation is in the fabrication of gratings of crystal or semiconductor material where the dimensions of the cuts are to be extremely small and the tolerances are to be kept within a range as small as several microns. Where work of this type is to be performed, conventional milling machines, which cut or grind by frictional contact of the tool with the material, are not entirely satisfactory. These conventional milling machines are either incapable of working at such small dimensions and tolerances or, because of the nature of the cutting or grinding operations they perform, can also fracture, break or otherwise disturb the material and adversely affect or destroy its usefulness.

The present invention overcomes the disadvantages of conventional milling machines by using an arc erosion process to machine materials to close tolerances without adversely affecting the physical or electrical properties of the material. The arc erosion milling machine of the invention uses the erosion effect produced on the material by a spark or arc discharge to perform a desired milling operation such as cutting or shaping. This substantially eliminates the mechanical stresses and strains produced by the cutting, grinding or routing steps of conventional milling processes and prevents the material from being fractured or otherwise disturbed physically. By using the present invention super-fine cutting and machining of materials to extremely small dimensions and to close tolerances can be achieved in a relatively simple and economical manner.

In accordance with the present invention material having electrically conductive properties is selected to be milled and this material is connected to one terminal of a power supply to serve as one electrode for the arc discharge which produces the erosion effect. The other electrode for the arc discharge is the milling tool which is connected to the other terminal of the power supply. The tool may be of any desired shape, for example a thin blade to cut or slice the material being worked, and the milling of the material is accomplished by bringing the tool and material into contact and then withdrawing the tool to strike an arc. Each time that an arc is struck a portion of the material being worked is eroded away. This process is repeated a number of times until the material is eroded in the desired manner to obtain a desired shape, cut or other type of milled configuration.

As used in the specification and claims the term "electrically conductive material" means any material capable of conducting electrical current. Included in this group of materials are the so-called good conductors such as the metals, silver, steel, copper, etc. Also included in this group are the so-called semiconductors which include materials such as silicon, germanium, indium-arsenide, indium-antimonide and any other semiconductor or crystalline material capable of conducting electrical current to some degree. It should therefore be clear that the arc erosion milling machine of the present invention can work on any type of material capable of conducting electrical current and thereby being able to serve as one of the electrodes for the arc discharge.

The arc erosion milling machine of the present invention is also electronically controlled and electrically driven to mill the material substantially automatically. In a preferred embodiment of the invention the milling tool is mounted in a holder at one end of a pivoted suspension arm. The suspension arm is balanced so that the tool normally falls against the material being worked to make contact. A solenoid connected to the other end of the arm is actuated after contact is made between the tool and material to draw the tool away thereby causing an arc to be struck to erode the material. A control circuit is also provided to quench the arc and thereby prevent the tool from becoming welded to the material. Once the arc is quenched the solenoid is de-energized and the tool is free to again fall into contact with the material to start another cycle of arc production. The reciprocating motion of the arm bringing the tool first towards and then away from the material continues automatically until the material is milled by arc erosion in the desired manner.

The arc erosion milling machine of the present invention is particularly useful in the fabrication of crystal gratings of hard brittle material which are to be cut or sliced in a desired pattern. Crystal gratings with minimum mechanical separation between cuts and good positional tolerances of the cuts are produced with minimum operator supervision by using the electronically controlled, electrically driven arc erosion milling machine while at the same time causing minimum crystal disturbance at the sensitive junction points of the crystal. It should be understood that while the arc erosion milling machine is particularly suited to super-fine cutting, the principles set forth in the present invention can be extended to larger machines and to mill any type of electrically conductive material as desired.

It is therefore an object of this invention to provide an electronically controlled, electrically driven arc erosion milling machine.

Another object of the invention is to provide an arc erosion milling machine in which the working tool is mounted at the end of a suspension arm and an electric circuit is provided for controlling the motion of the arm.

A further object of the invention is to provide an arc erosion milling machine for working on electrically conductive materials, the milling machine being provided with a tool which serves as one electrode of an arc discharge device while the material being worked serves as the other electrode.

Yet another object of the invention is to provide an arc erosion milling machine for working electrically conductive materials in which electrical contact of the working tool with the material being worked controls the withdrawal of a suspension arm on which the tool is mounted.

A further object of the invention is to provide a machine for milling electrically conductive materials in which the milling is accomplished by drawing an electric arm between the material being worked and the cutting tool and in which a circuit is provided to automatically quench the arc.

Other objects and advantages of the present invention will become more apparent upon reference to the following specification and annexed drawings in which:

FIGURE 1 is a longitudinal plan view taken partially in section of the arc erosion milling machine;

FIGURE 2 is a top plan view of the machine of FIGURE 1;

FIGURE 3 is a perspective view of the solenoid control; and

FIGURE 4 is a schematic diagram of the electronic control and electrical drive circuit for the machine.

Referring to FIGURES 1–3, the mechanical details of the milling machine are shown. Here, the object 10 of electrically conductive material to be milled is fixedly mounted within a vise 12 which is also of an electrically conductive material such as metal. The vise is mounted in electrically conductive relationship to the inside of a liquid-tight electrically conductive cup 14 by two screws or other suitable fastening members 13. The object 10 is held within a slot in the vise 12 by a pair of pins 16 (only one of which is shown) which are moved in bores in the vise against the object 10 by a plate 17 held to the vise by one or more threaded screws 19 fastened thereto. The cup is filled with a quantity of a dielectric fluid 15, such as kerosene, transformer oil, or other suitable type of fluid, to a level which completely immerses the object. The fluid 15 covers the object and the arc and thus serves to quench the arc, control the erosion area on the object, protect the object by removing heat, and to damp the motion of the suspension arm.

The electrically conductive cup 14 is mounted on a block 20 of electrical insulating material, the block 20 in turn being mounted on a first slide member 22 which moves on a track 25. The track 25 is mounted on a pivot 27 to a second slide member 24 which is movable along a stationary track 31 mounted on a base member 26. The first slide member 22 and track 25 are rotatable about the pivotal mounting 27 and a control knob 29 is provided to position the first slide member at a desired location on the track 25. The angular position of the first slide member about the pivot 27 is adjusted by another control knob (not shown). The second slide member 24 is moved along its track 31 by the adjustment of a micrometer dial member 33. The slide members and pivot mounting are conventional in the art and any suitable type may be used. By suitably adjusting the longitudinal position of the two slide members 22 and 24 and by rotating the first slide member about the pivot 27 the object 10 can be turned to any desired position with respect to the milling tool.

The milling tool 35 is illustratively shown as a thin metallic wire which is stretched between the two arms of a C-shaped rigid tool head or holder 37 mounted at one end of an elongated tubular suspension arm 39. It should be understood that the tool 35 may be of any desired shape, for example a flat blade, a pointed instrument, a tool shaped to achieve a desired groove or cut a given pattern, or any other suitable tool of electrically conductive material. The milling machine has operated successfully using tungsten blades in the range from about .0005 inch to about .003 inch thick. Brass blades in the order of .001 inch have also operated successfully. The tool holder 37 may be of any suitable shape needed to hold the tool as long as it is rigid enough to keep the tool from wobbling and missing the specified contact point with the object. A damping vane 38 is fastened to the holder 37 at a position where it is immersed in the dielectric fluid 15 at the time when the tool 35 contacts the object 10. The damping vane also aids in preventing the tool from wobbling thereby further increasing the accuracy within which contact with the object can be made. It should be understood that any other suitable type of damping arrangement may be used, for example, connecting a hydraulic cylinder to the arm itself.

The suspension arm 39 has a cross arm 40, each of whose ends 41 is mounted in a set of ball bearings 42 between two spaced posts 44. This permits the arm 39 to move in a vertical direction, within limits. The lower end of each post 44 is fastened to a platform 45, located on the base member 26, by screws or other suitable fasteners 47.

The end of the suspension arm 39 opposite the tool head has a threaded portion 49 on which is mounted an adjustable counterweight 51. The counterweight is movable along the length of the threaded portion and a balance point is preferably sought so that the tool head 37 will just drop down into contact with the object with minimum contact force. That is, the arm 39 and the counterbalance 51 are so arranged that the tool 35 normally touches the work 10. This prevents fracturing of the object by the combined weight of the tool and head.

As shown best in FIGURE 3, the end of the arm adjacent the threaded portion 49 is connected by a pivotal link 53 or actuator to the movable core of an electrically operated solenoid 55. The solenoid is mounted on a bracket 57 having a slot or opening 58 therein to permit movement of the arm. In the energized condition shown the solenoid core is retracted within the solenoid coil and the tool is out of contact with the object. When the solenoid is de-energized, the tool head is free to drop down towards and make contact with the object. The bracket 57 is mounted within a vertical track 61 (FIGURE 1) so that its position and the position of the solenoid can be readily changed in a vertical direction by an adjusting screw 63. The vertical track 61 is mounted on a block 65 which is fastened to the base member 26. By varying the position of the solenoid the downward movement of the head 37 and the depth of the erosion produced by the tool 35 can be controlled.

In order to control the motion of arm 39, a screw 66 is mounted in a bent-over tab portion on the top of the bracket 57. The screw 66 is adjusted to engage the end of arm 39 adjacent the solenoid 55 to limit its upward travel extreme. This limits the downward motion of the head 37 and the tool 35. Upward motion of the tool and head is limited by a leaf spring 67 mounted on solenoid bracket 57 and extending under the threaded end of the arm 39. The position of spring 67 is adjusted by a screw 68 located in a second bent-over tab portion on bracket 57 to set the lower travel extreme of the threaded end of the arm 39. The two travel extremes for the arm can be set by suitably adjusting the positions of screw 66 and spring 67.

Normally, elements 66 and 67 are set to allow the arm to travel only a relatively short distance therebetween in order to increase the frequency of oscillation or reciprocation of the arm. The arm travel is preferably set so that the vane 38 is always in the fluid 15. Thus, damping is produced by vane 38 as the head 37 travels in both directions toward and away from the object. This effectively loads the arm to move the rate of arm action away from the arm's natural resonant frequency and also smooths the arm response.

The electrical and electronic control circuit for operating the solenoid and for producing the arc current is located in the housing 70. The components in the housing 70 are described in detail below. Generally, the housing 70 contains a power supply for producing current for the arc. The power supply has positive and negative terminals, one of which is connected to the cutting tool 35 (via resistors 97–99) in any suitable manner, for example, by making the arm 39, head 37 and the tool 35 of electrically conductive material and bringing that terminal (via resistors 97–99) of the power supply to a connection on the arm, for example, by a clip lead (not shown). The other terminal of the power supply is electrically connected, for example, by a clip lead (not shown), to the metallic cup 14 and thus to the object 10. In this arrangement for supplying arc current, the arm 39 is suitably insulated from the base 26 by making the posts 44 or mounting block 45 and the vertical track 61 or mounting block 65 of electrically insulating material. This will insulate the current carrying elements from base 26. The cup 14 is also electrically insulated from the first slide 22 by making the plate 20 of insulating material.

The operation of the arc erosion milling machine of FIGURES 1–3 is as follows. When the power supply in housing 70 is turned on and the solenoid 55 is energized, the cutting tool is out of contact with the object. During this time the arc current is being stored in a capacitor in the power supply. When the solenoid is de-energized the head 37 drops down into the cup 14 to bring the tool 35 into contact with the object 10. The tool 35 and the object 10, by virtue of their electrical connections to the respective terminals of the power supply, form two electrodes of an arc-discharge device. After contact is made between the tool 35 and the object 10 the arc current is caused to flow out of the capacitor. At the same time the solenoid is energized by a control circuit and the tool 35 is drawn away from the object. This produces an arc discharge which erodes away material on the object surface area where the arc is struck. As the head travels up, the arc is quenched by a control circuit in the housing 70 and the solenoid is automatically de-energized. This permits the tool 35 to fall back into contact with the object to start the erosion cycle over again. The times of energization and de-energization of the solenoid are controlled, in a manner to be described, to control the stroke of the arm, i.e., the time between two contacts of the tool with the object.

By continually repeating this oscillatory or reciprocating motion of the arm 39 the surface of the object where contact is made with the tool is eroded. The position of the surface erosion can be controlled by adjusting the two slides 22 and 24 and the pivot and the depth of erosion by adjusting the solenoid in the vertical track 6. Contact between the tool and object is very light because of the presence of the counterweight 51 and the damping vane 38. As pointed out before, the shape of the tool 35 can be selected to achieve the desired type of erosion pattern. Thus, for example, where it is desired to make one or more narrow cuts in a thin slab of conductive material, the tool 35 is selected to be a fine wire. The arm 39 is allowed to reciprocate a number of times sufficient to erode the material to produce a cut of the desired depth, this depth being controlled by positioning the solenoid in the vertical track. It should be obvious that the cut can be made at any position and any desired angle with respect to the slab merely by positioning the two slides 22 and 24 and adjusting the pivot 27.

As pointed out before, the damping vane 38, vertical stop 66 and leaf spring 67 serve to speed up the arm reciprocation by making the oscillation period of the arm less than the period of its natural resonant frequency. The latter would normally be determined by the arm's length, pivot point, and other factors. The vane 38 also cooperates with the quenching fluid 15 in the cup to damp the downward motion of the head 37 so that contact with the object 10 is relatively smooth and without jarring. The downward travel of the head 37 is also limited by the vertical stop 66 and the position of this stop determines the lowest point to which the head 37 can descend into the cup.

FIGURE 4 shows a preferred embodiment of a circuit located in the housing 70 for producing the current to strike the cutting arc and for controlling the quenching of the arc. This circuit also controls the operation of the solenoid 55 to reciprocate the suspension arm and move the tool 35 towards and away from the object 10. In FIGURE 2 power for the circuit is supplied from a suitable source of alternating current (not shown) to the primary winding of a transformer 80 through a single-pole single-throw switch 81. The ends of the secondary winding of transformer 80 are connected to the diagonally opposite input corner terminals of a conventional bridge type full-wave rectifier 83. A resistor 84 is placed in one of the secondary leads to limit the secondary operating current as a safety precaution. One of the output corner terminals of rectifier 83 is connected to a source of reference potential such as ground 85 while the diagonally opposite output corner terminal is connected to the upper end of a filter capacitor 87 whose lower end is also connected to ground. The capacitor serves as the D.C. voltage and current supply for the circuit. The terminals of filter capacitor 87 are the positive and negative terminals of the power supply system.

The operation of the bridge type full-wave rectifier circuit and filter capacitor is conventional in that a pulsating direct current voltage is applied from the rectifier across the capacitor and the capacitor smooths this pulsating voltage into a direct current voltage. If desired any other suitable type of rectifier and/or filter circuits may be used with the present invention, as is conventional in the art.

The current for the arc discharge is supplied by a capacitor 89 which charges to store energy from the D.C. voltage source through a series-connected charging resistor 90 whose upper end is connected to the ungrounded end of filter capacitor 87. The quantity of energy stored in capacitor 89 is dependent upon the RC time constant of the resistor 90 and capacitor 89. This time constant is preferably selected to be less than the stroke period so that a substantially full charge can be stored on the capacitor between contacts of the tool with the object.

A first transistor 92, illustratively shown of the PNP type, has its emitter connected to the junction of capacitor 89 and resistor 90. The base of this transistor is connected to ground by a resistor 93 while the collector is connected through a current limiting resistor 95 to one electrode 35 of the arc gap which, as previously described, is the tool 35. The object 10, which forms the other arc gap electrode, is connected to the ground or reference point 85 of the circuit through the electrically conductive vise 12 and cup 14. The collector and emitter of 92 are in series with resistors 90 and 95 and the electrode elements 35 and 10 so that when the electrodes 10 and 35 are in contact the collector and emitter elements of transistor 92 provide a variable resistance discharge path for capacitor 89. The resistance parameter is regulated by a second transistor 100 as will be seen.

The base of a third transistor 105 is returned to the D.C. supply through a voltage divider network formed by the series connected fixed value resistors 97 and 98 and the variable resistor 99. The center arm of resistor 99 is connected to one of its own ends and is movable to short out a selected portion of the resistor to control its overall resistance. Transistor 92 has its base directly connected to the collector of a control transistor 100 which is returned to ground through a resistor 93. The values of the resistors 97, 98 and 99 of the voltage divider are selected so that transistor 105 is normally not conducting when the two electrodes 10 and 35 are not in contact. It should be seen that transistor 92 and resistor 95 are in series between the D.C. supply and the electrode 35. As described below, the conduction of transistor 92 is controlled to effectively make it a variable resistor in the arc current supply path so that the arc current can be controlled in a predetermined manner.

Once the cutting tool 35 momentarily contacts the object 10, the collector of transistor 92 is essentially shorted to ground. When this occurs a heavy surge of current starts to flow from the capacitor 89 through the transistor 92 and resistor 95. It is this discharge current which produces the arc as the tool is drawn away from the object. The arc current is limited by the resistance of the transistor 92, which is normally almost insignificant when the transistor is fully conducting, and the value of resistor 95. This resistor is selected to limit the current to a predetermined safe value.

The solenoid 55 is operated to snap the tool away from the object and start the production of the arc in the following manner. Contact of the arc gap electrodes 10 and 35 applies a large forward bias from the voltage divider 97, 98 and 99 to the base of a normally cut-off PNP transistor 105 and causes it to conduct. Transistor 105 has its emitter connected directly to the D.C. supply and its base to the junction of resistors 97 and 98 of the voltage divider. The collector of transistor 105 is connected to one end of the coil of the solenoid 55 and the other end of this coil is connected to ground. When transistor 105 conducts it energizes the solenoid causing the core to retract and pull the tool away from the object. As the two electrodes separate an arc is produced therebetween which erodes the surface of the object in the manner previously described. A diode 109 is connected across the solenoid coil to prevent voltage surges from feeding back to the collector of transistor 105.

Since the contact pressure between the tool and the object is small, once the arc is struck it becomes necessary to extinguish it in a controlled manner to prevent welding of the tool to the object. This is accomplished by the control transistor 100 whose collector is directly connected to the base of transistor 92. The emitter of transistor 100 is connected directly to the D.C. supply while its base is connected to arc gap electrode 35 and the lower end of adjustable resistor 99 through a resistor 102. Transistor 100 is normally biased to be cut off in the absence of the arc but it starts to conduct after the electrode 35 is grounded and the arc is struck. The arc conductance forward biases transistor 100 into conduction and the resultant drop of its collector voltage appears as a reverse bias at the base of transistor 92 to decrease its conduction and finally cause it to be non-conductive. As transistor 92 goes from conduction to non-conduction its resistance increases and, since it is in series with electrode 35 and the D.C. supply, it decreases the arc current. The turn-off of transistor 92 to non-conduction is desirably effected very rapidly so, effectively, it is switched from an "on" to an "off" condition by control transistor 100. This prevents welding of the tool to the object.

The bias for transistor 105 which controls the current to the coil of the solenoid is obtained from the voltage divider 97, 98 and 99. This bias sets the time at which transistor 105 will start to conduct after contact is made between the tool and object and the time at which the transistor becomes non-conductive, after the arc current drops below the value necessary to produce a forward bias sufficient to cause conduction. By adjusting the resistor 99 the pull-in (energization) and drop-out (de-energization) times for the solenoid can be readily controlled. This effectively sets the stroke time for the reciprocation of the arm. The stroke of the arm is usually adjusted coarsely by setting the various springs and mechanical stops and then adjusted to the final rate by the variable resistor 99.

To complete the circuit a pair of terminals 110 and 111 are provided between one arc electrode 35 and ground. These terminals permit the arc to be monitored by an oscilloscope. An ammeter can also be connected in series between the electrode 35 and the current limiting resistor 95 to monitor the average current.

While the circuit of FIGURE 2 has been shown as using a direct current for charging the capacitor used to supply the arc current, it should also be understood that other types of currents can be used in the arc. For example, it might be desirable to use a modulated or pulsating direct current, a direct current on which is superimposed an alternating current component, or an alternating current alone. Also, it is possible to vary the frequency of the alternating current for the arc for milling different types of material. Suitable power supplies for producing these different types of currents are well known in the art and no further description is needed. These currents would be supplied to the electrode 35 in any of several ways. For example, the output of an oscillator can be connected to the emitter of transistor 92 to modulate the D.C. current from the capacitor. Where a pulsating D.C. or straight A.C. current is to be used, the capacitor 89 can be replaced by a suitable source for producing such currents.

The optimum rate and time of arm reciprocation to machine any given object varies with the object size and material, type and magnitude of current used and the size of the tool. In one typical example a reciprocating arm rate of about 20 cycles per second was successful in cutting delicate indium antimonide crystals. By using a .001" brass blade, a .003" cut of a depth of ⅛" was obtained having a tolerance of .0001" on either side of the center of the cut.

Therefore, it can be seen that a novel milling machine of the arc erosion type has been provided which is capable of working substantially automatically on delicate materials.

While a preferred embodiment of the invention has been described above it will be understood that this embodiment is illustrative only and the invention is to be limited solely by the appended claims.

What is claimed is:
1. An arc erosion milling machine for working an object of electrically conductive material comprising
   an adjustably counterbalanced arm having a free end and adapted to swing,
   a tool carried by said end,
   a source of electrical current connected between said tool and said object for producing an arc discharge to erode the object when the tool and object have a spaced relationship therebetween,
   means responsive to the contact between the tool and object for moving said arm to remove said tool from said object,
   and container means for holding said object therein, said container means also holding a quantity of a damping fluid therein for damping the motion of the arm and tool.

2. An arc erosion milling machine for working an object of electrically conductive material comprising:
   a tool,
   a source of electrical current connected between said tool and said object for producing an arc discharge to erode the object when the tool and object have a spaced relationship therebetween,
   means responsive to the contact between the tool and object for moving said tool with respect to said object,
   container means for holding said object therein, said container means also holding a quantity of a fluid therein for damping the motion of the tool, and a damping vane mounted for movement in said fluid with said tool to provide additional damping therefor.

3. An arc erosion milling machine for working an object of electrically conductive material comprising
   a counterbalanced arm having a free end,
   an electrically conductive tool mounted on said free end of said arm,
   a source of electrical current connected between said tool and said object, said tool closing an electrical circuit with said current source upon contact with said object and an arc discharge occurring as the tool is spaced from said object, electrically operated means responsive to the contact of the tool and object for moving said arm to draw the tool away from contact with said object, and means responsive to the production of the arc discharge for quenching the same by diminishing the current available from the source as the spatial relationship between the tool and object is changed.

4. An arc erosion milling machine for working an object of electrically conductive material comprising a counterbalanced suspension arm, an electrically conductive tool mounted at one end of said arm, means for balancing said arm to normally produce contact between said tool and said object, a source of electrical current connected between said tool and said object, said tool closing an electrical circuit with said current source upon contact with said object and an arc discharge occurring as the tool is spaced from said object, electrically operated means responsive to the contact of the tool and object for moving said arm to draw the tool away from contact with said object, and container means for holding said object therein, said container means also holding a quantity of a damping fluid therein for damping the motion of said tool.

5. An arc erosion milling machine for working an object of electrically conductive material comprising:

a suspension arm, an electrically conductive tool mounted at one end of said arm, means for balancing said arm to normally produce contact between said tool and said object, a source of electrical current connected between said tool and said object, said tool closing an electrical circuit with said current source upon contact with said object and an arc discharge occurring as the tool is spaced from said object, electrically operated means responsive to the contact of the tool and object for moving said arm to draw the tool away from contact with said object, container means for holding said object therein, said container means also holding a quantity of a fluid therein for damping the motion of said tool, and a damping vane mounted for movement in said fluid with said tool to provide additional damping therefor.

6. An arc erosion milling machine for working an object of electrically conductive material by producing an arc discharge between two electrodes, one of which is said object, comprising:

a counterbalanced suspension arm, an electrically conductive tool mounted at one end of said suspension arm, said tool serving as the other electrode for the arc discharge, said arm normally urging the electrodes together, a source of electrical current having two terminals, a time constant circuit comprising a charging resistor and a capacitor connected in series between said terminals so as to store energy, a first transistor having three elements of which two are connected in series with said charging resistor and said electrodes to provide a variable resistance shunt path across said capacitor, which path is closed so that the capacitor discharges energy through said electrodes as the electrodes contact, the third element being a control element, means mechanically connected to said arm and responsive to flow of current between said electrodes for moving the arm in a direction to break contact between said electrodes whereby the continued flow of energy through said shunt path by discharge of said capacitor produces an arc discharge between said electrodes, and a second transistor having two elements connected in series between one of said terminals and said electrodes and a third element so connected to said control element as to bias said control element in the reverse direction in response to flow of current between said electrodes, thereby to increase the resistance of said shunt path and to terminate the discharge of said capacitor.

7. In an arc erosion milling machine the combination of:

a source of power having two terminals, metallic tool and work electrodes, a time constant circuit coupled to said terminals and comprising a resistor and a capacitor for storing the energy required for said arc discharge, first transistor means having a control element and other elements connected in series with said resistor and said electrodes to provide a variable resistance shunt and discharge path across said capacitor, which path is closed by contact between said electrodes so that the capacitor discharges energy across said electrodes and continues to discharge energy to provide an arc after the electrodes are separated, second transistor means having an output element connected to said control element and other elements connected in series with said electrodes and a terminal of the power source to sense the flow of current between said electrodes and to apply to said control element a reverse bias which turns off the first transistor means, thereby to terminate the arc discharge, a counterbalanced suspension arm having a free end on which said terminal is mounted, said arm normally urging said electrodes into contact, and means mechanically coupled to said arm and responsive to flow of current between said electrodes to move the arm in a direction to break contact between said electrodes.

8. An arc erosion milling machine in accordance with claim 7 in which the last-mentioned means comprises dropping resistance in series with said electrode and terminals, a solenoid having an actuator mechanically connected to said arm, and also having a coil, together with a third transistor means having a biasing electrode coupled to said dropping resistance and two elements in series with said coil and across said terminals, the third transistor means being biased into conductivity to energize said coil when current flows between said electrodes.

References Cited
UNITED STATES PATENTS

| | | | |
|---|---|---|---|
| 2,079,310 | 5/1937 | Bennett | 219—69 X |
| 2,383,383 | 8/1945 | Harding | 219—69 |
| 2,753,429 | 7/1956 | McKechnie | 219—69 |
| 3,018,411 | 1/1962 | Webb | 219—69 X |
| 3,098,150 | 7/1963 | Inoue | 219—69 |

ANTHONY BARTIS, *Primary Examiner.*

RICHARD M. WOOD, *Examiner.*

R. F. STAUBLY, *Assistant Examiner.*